United States Patent [19]

Laurizio

[11] 4,116,499
[45] Sep. 26, 1978

[54] HIGH TEMPERATURE SLIDE BEARING

[75] Inventor: Daniel V. Laurizio, Convent, N.J.

[73] Assignee: The Fluorocarbon Company, Anaheim, Calif.

[21] Appl. No.: 824,204

[22] Filed: Aug. 12, 1977

[51] Int. Cl.² .............................................. F16C 29/02
[52] U.S. Cl. .................... 308/3 R; 138/106;
  248/55; 308/DIG. 8; 308/DIG. 14
[58] Field of Search ............ 308/3, DIG. 14, DIG. 8,
  308/239, DIG. 7; 248/55, 49, DIG. 1, 62;
  138/105, 106

[56] References Cited

U.S. PATENT DOCUMENTS 3,350,143 10/1967 Lichowsky ...................... 308/239 X
3,390,854 7/1968 Sherburne ....................... 308/3 R X Primary Examiner—Trygve M. Blix
Assistant Examiner—Douglas C. Butler
Attorney, Agent, or Firm—Knobbe, Martens, Olson, Hubbard & Bear

[57] ABSTRACT

A layer of Teflon fluorocarbon resin material forming a slide bearing surface is isolated from a high temperature load by a body of heat insulating load bearing material captured between a pair of carbon steel channel or box-like members. These members are also joined by a pair of side support elements which have holes therethrough for air circulation. A layer of brass is welded to the lower channel member, and the fluorocarbon layer is attached to the brass plate by a plurality of spike-like projections formed from the plate. These projections provide heat conducting paths that engage a stainless steel plate forming the other component of the slide bearing.

11 Claims, 4 Drawing Figures

FIG. 1.
FIG. 2.
FIG. 4.
FIG. 3.
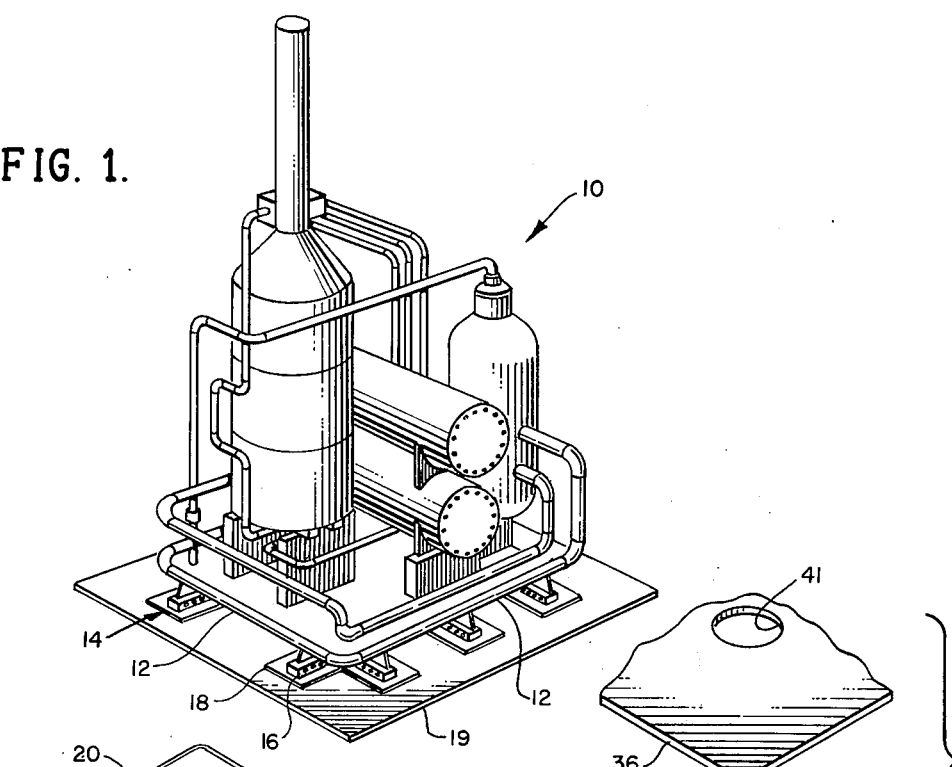
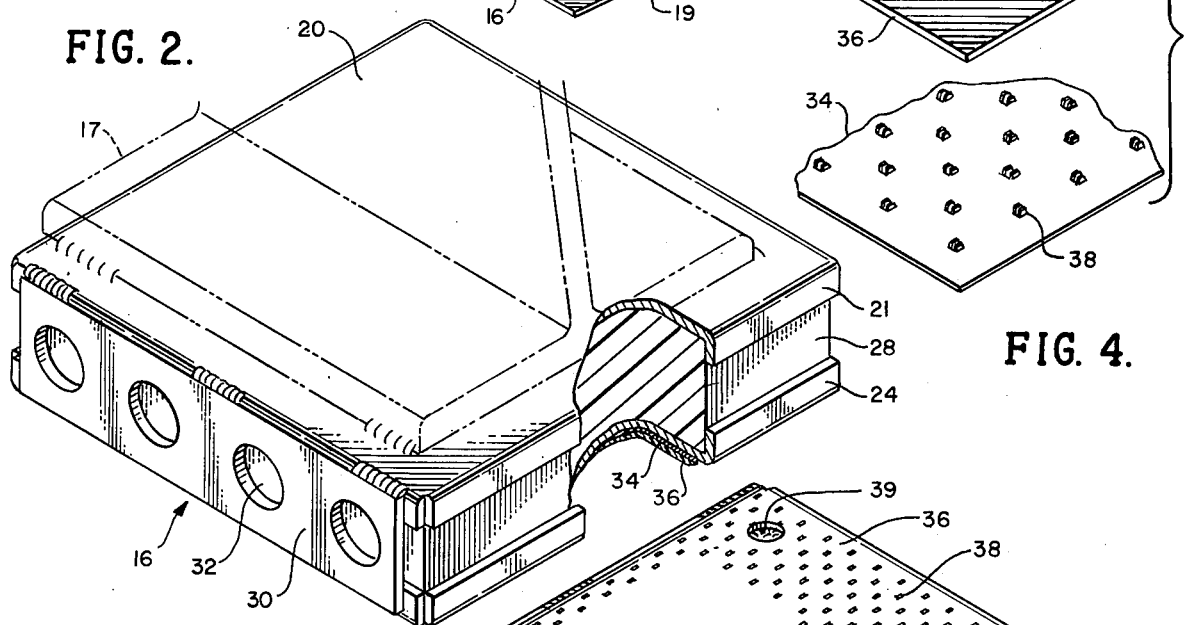
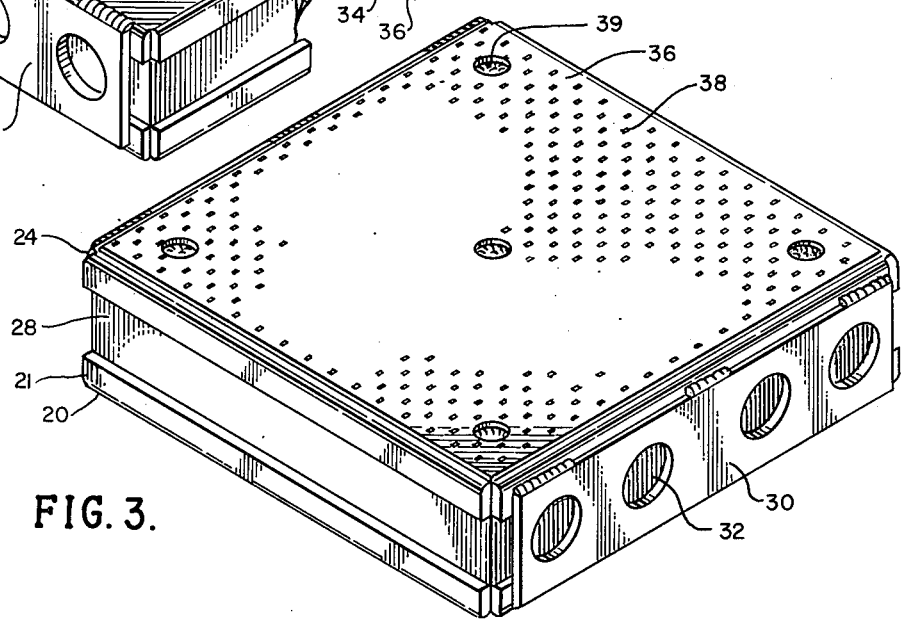

HIGH TEMPERATURE SLIDE BEARING

BACKGROUND OF THE INVENTION

This invention relates to slide bearings and particularly to an improved slide bearing system capable of accommodating elevated temperatures.

Teflon fluorocarbon resin materials have been used in slide bearings for many years. One such bearing material currently available, under the trademark Fluorogold, from The Fluorocarbon Company is a special formulation of fluorocarbon resin reinforced with a strong glass aggregate and other agents. This provides a structural material which offers significant compressive strength without cold creep, yet retains the low friction properties and chemical inertness of the fluorocarbon material. Such bearings have been used in bridges, buildings, transit systems, pipe lines and other applications to support heavy loads which must move laterally to accommodate expansion and contraction. Such bearings provide economy and maintenance free dependability continue as permanent as the structure they support.

One limitation of such bearing material is that at elevated temperatures the material begins to soften and lose some of its ability to withstand heavy compressive loads, and the coefficient of friction increases. Consequently, bearings made of this material have in the past not been suitable for high temperature applications. There are many such applications wherein industrial equipment is operated at elevated temperatures and it is desirable to mount such equipment on slide bearings to handle expansion and contraction. Hence, a need exists for practical slide bearings employing material of this type in a system which can reliably withstand the high temperatures.

SUMMARY OF THE INVENTION

In accordance with the invention, a layer of fluorocarbon resin or other such low friction material used in slide bearings to form one surface of the bearing is mechanically locked to a plate made of a metal which is a good heat conductor. This metal plate is connected to the structure being supported, but a body of heat insulating load bearing material is between the plate and the load. Consequently, most of the heat from the load is kept from the fluorocarbon bearing surface by the heat insulation. The small amount of heat which does reach the surface is conducted quickly through the fluorocarbon material so that the heat rise to which the bearing is subjected is kept to a minimum. The heat passing through the bearing is dissipated into a metal plate forming the other surface of the bearing.

In a preferred form of the invention, the fluorocarbon material is connected to a brass plate which has a plurality of small spike-like projections with the projections extending through the layer of fluorocarbon to mechanically hold the fluorocarbon material. Also, the ends of these projections engage the other bearing surface to form tiny heat conductive paths. The brass plate is in turn welded to the lower stainless steel member which is welded to an upper member to provide a box for capturing the load bearing insulating material. Such an arrangement will reduce temperatures across the bearing quite significantly such that the bearings can accommodate temperatures up to a 1,000° F with a reasonable thickness of insulating material.

DETAILED DESCRIPTION OF THE INVENTION

For a more thorough understanding of the invention, refer now the the following detailed description and drawing in which:

FIG. 1 is a perspective view of industrial apparatus having high operating temperatures and using the slide bearings of the invention;

FIG. 2 is an upper perspective view of the main slide bearing component of the invention;

FIG. 3 is a lower perspective view of the component of FIG. 2; and

FIG. 4 is an enlarged, fragmentary, perspective view of the layer of fluorocarbon bearing material illustrating the manner in which it is mechanically locked to a metal plate which is a good conductor.

FIG. 1 is a perspective view of any large piece of industrial apparatus 10 that has high operating temperatures and has need for slide bearings to support the structure. Examples of such are heat exchangers and precipitators. In FIG. 1, the pipes 12 or other portions of the apparatus are supported by slide bearings 14 made in accordance with this invention. The bearings include a main upper component 16 which is attached to a support leg 17 connected to the pipe 12. The upper component 16 slides on a lower component 18 consisting of a sheet of stainless steel attached to support surface 19 for the apparatus.

Referring to FIGS. 2 and 3, the bearing component 16 includes an upper member or plate 20 which has a shallow box-like shape in view of its short depending side walls 21. The member 20 is welded or otherwise suitably attached to the support leg 17 which is connected to the hot pipe being supported. A lower support member 24 which is identical to the upper member 20 cooperates with the upper member 20 to enclose partially a body 28 of load bearing heat insulating material. The support members 20 and 24 are welded together by short side wall sections 30 having holes 32 therethrough. The upper and lower members 20 and 24 are preferably formed of carbon steel and the side sections are also formed with suitable steel.

A variety of heat insulating load supporting materials may be used for the body 28. One suitable material is that referred to as Marinite sold by Johns Mansville. This material is primarily calcium silicate with inert fillers and reinforcing agents which can withstand considerable compressive load. The short side walls 21 on the upper and lower support members 20 and 24 are provided to give further lateral support to the insulating material. In low load applications, side walls 21 may not be needed on all four sides of the members 20 and 24.

Attached to the lower support members 24 is a sheet or layer 34 of good conductive metal such as brass and a layer 36 of fluorocarbon resin bearing material having a low coefficient of friction. Before being attached to the lower support member 24, the brass and fluorocarbon are mechanically connected. More specifically, the brass plate 34 is punched to provide a plurality of small projections 38 as illustrated in FIG. 4. The layer of fluorocarbon material is then softened by heat and pressed onto the spike-like projections 38 so that the sheet of fluorocarbon material is impaled on the projections 38. As seen from FIG. 3, the tips of the projections 38 extend through the fluorocarbon layer 36 so that the bearing surface is formed by a combination of the low friction fluorocarbon material and the tips of brass. The brass plate 34 is then welded to the lower member 24 by suitable spot welds 39 formed through holes 41 cut in the sheet of fluorocarbon material.

With this arrangement, the tips of the spike like projections engage the surface of the lower bearing elements 18 and form small heat conductive paths which quickly transmit or dissipate heat through the fluorocarbon material, thus minimizing its temperature rise. Of course only a limited quantity of heat even reaches the bearing layer 36 because of the insulating material 28 restricting the flow of heat. The thickness of the insulating body 28 can, of course, be varied to provide the amount of insulation which is desired. It has been found that with a bearing having an insulated body 28 of 1 inch thickness, temperatures ranging from 400° to 1,000° on the upper surface of the bearing plate 20 are reduced to about 100° F to 400° or 500° F at the layer 36.

While a variety of low friction bearing materials may be employed, the Fluorogold referred to above is most satisfactory. The coefficient of friction of such material is very low varying from 0.03 at maximum pressure to 0.08 at minimum pressure. Slide bearings of the type described herein and employing the Fluorogold material can handle relatively high loads such as 2,500 pounds per square inch.

What is claimed is:

1. In a slide bearing for high temperature applications:
   a plate made of good heat conductive material; and
   a layer of bearing material mechanically locked to said plate to form a slide bearing surface adapted to engage a mating, metal slide bearing surface, said layer of bearing material having a low coefficient of friction and being able to withstand heavy loads when kept below a predetermined temperature, portions of good heat conductive material connected to said plate and extending through said layer to form heat conductive paths to conduct heat quickly away from said layer to keep the temperature of said layer below said predetermined temperature.

2. The bearing of claim 1 wherein said plate has a plurality of spike-like projections extending through said layer of material for mechanically locking the layer to said plate, said projections having free ends engaging said metal surface to provide said heat conductive paths.

3. The bearing of claim 2 wherein said layer is made of a fluorocarbon resin material and said plate is made of brass or other metal which is a good heat conductor.

4. The bearing of claim 1 including a body of load bearing, thermally insulating material extending between said plate and a high temperature load to transmit the compressive forces of the load while isolating said plate from most of the heat.

5. The bearing of claim 4 wherein said body of insulating material is captured between support members, one of which is connected to the high temperature load and the other which is connected to said plate.

6. The bearing of claim 5 wherein said members capturing the heat insulating material are joined along their edges by strips of metal having holes therethrough to facilitate the circulation of air for cooling purposes so as to minimize the transfer of heat to said plate.

7. The bearing of claim 5 wherein said support members capturing the insulating material are made of steel and said plate is made of brass.

8. A slide bearing for high temperature applications comprising:
   a body of load bearing insulating material captured within a pair of steel members having side wall means which confine the insulating material laterally;
   support elements having holes therethrough connected between said side wall means of said members;
   a plate of good heat conductive material attached to one of said members and having a plurality of spike-like projections extending outwardly from said plate;
   a layer of fluorocarbon resin material having a low coefficient of friction mechanically locked to said plate by said spike-like projections, with the tips of said projections extending through the low friction material so that the projections form heat conductive paths which transmit heat from said heat conductive plate to a metal member which forms a slide bearing surface engaged by said fluorocarbon material.

9. A method of supporting a high temperature load on a slide bearing having a pair of mating bearing surfaces with a layer of low friction material forming one of the bearing surfaces, said material being unable to tolerate high temperatures, comprising the steps of:
   thermally isolating said layer from most of the heat of said load; and
   positioning in said layer means more thermally conductive than said layer to form a plurality of heat conducting paths through the layer for conducting the heat reaching said layer rapidly through the layer and into the other bearing surface so that the temperature of said layer is kept substantially below said high temperature.

10. The method of claim 9 wherein said layer is thermally isolated from the heat by positioning a body of load bearing, insulating material between said load and said layer.

11. The method of claim 9 wherein the heat is conducted through said layer by a plurality of spike like projections which engage said other bearing surface and are connected to a heat conductive plate which is mechanically locked to said layer.

* * * * *